United States Patent
Deng (10) Patent No.: US 11,533,977 B1
(45) Date of Patent: Dec. 27, 2022

(54) NAIL STICKER, COMPOSITION FOR NAIL STICKER AND METHOD FOR PREPARING COMPOSITION

(71) Applicant: SHANGHAI HUIZI COSMETICS CO., LTD., Shanghai (CN)

(72) Inventor: Jingbiao Deng, Shanghai (CN)

(73) Assignee: SHANGHAI HUIZI COSMETICS CO., LTD., Shanghai (CN)

( * ) Notice: Subject to any disclaimer, the term of this patent is extended or adjusted under 35 U.S.C. 154(b) by 0 days.

(21) Appl. No.: 17/685,540

(22) Filed: Mar. 3, 2022

Related U.S. Application Data (63) Continuation of application No. PCT/CN2021/110180, filed on Aug. 3, 2021.

(51) Int. Cl.
| | |
|---|---|
| B32B 7/12 | (2006.01) |
| A45D 29/00 | (2006.01) |
| C09J 7/29 | (2018.01) |
| C08K 9/10 | (2006.01) |
| C09J 163/00 | (2006.01) |

(52) U.S. Cl.
CPC .............. *A45D 29/001* (2013.01); *C08K 9/10* (2013.01); *C09J 7/29* (2018.01); *C09J 163/00* (2013.01); *C09J 2301/408* (2020.08); *C09J 2301/416* (2020.08); *Y10T 428/287* (2015.01); *Y10T 428/2809* (2015.01); *Y10T 428/2891* (2015.01)

(58) Field of Classification Search
None
See application file for complete search history.

(56) References Cited

U.S. PATENT DOCUMENTS

| | | | | | |
|---|---|---|---|---|---|
| 4,112,190 | A | * | 9/1978 | Sato | B05D 5/067 428/457 |
| 4,412,048 | A | * | 10/1983 | Dixon | C08G 59/18 522/100 |
| RE32,713 | E | * | 7/1988 | Woo | B01J 13/025 428/323 |
| 2005/0022834 | A1 | * | 2/2005 | Hwang | A45D 31/00 132/73 |
| 2008/0241452 | A1 | * | 10/2008 | Kondo | H05K 3/386 524/133 |
| 2012/0263905 | A1 | * | 10/2012 | Park | C09J 7/21 427/160 |
| 2014/0158296 | A1 | * | 6/2014 | Wigdorski | C09J 7/20 522/111 |
| 2014/0329041 | A1 | * | 11/2014 | Kim | A45D 31/00 427/536 |

FOREIGN PATENT DOCUMENTS

| | | |
|---|---|---|
| CN | 102040935 A | 5/2011 |
| CN | 104771381 A | 7/2015 |
| CN | 111035575 A | 4/2020 |
| KR | 1020170111293 A | 10/2017 |

OTHER PUBLICATIONS

Helen West, "What Are Essential Oils, and Do They Work?", Aug. 22, 2022 (Year: 2022).*
Office Action issued in corresponding Chinese Application No. 202110883614.9, dated Apr. 1, 2022, with machine translation.

* cited by examiner

*Primary Examiner* — Anish P Desai
(74) *Attorney, Agent, or Firm* — Hamre, Schumann, Mueller & Larson, P.C.

(57) ABSTRACT

A nail sticker, a composition for the nail sticker and a method for preparing the composition are disclosed. Raw materials of the composition include a sizing material, which is made of the following raw materials in parts by weight: 45-85 parts of a UV thermosetting resin, 2-9 parts of a photoinitiator, 1.5-2 parts of a curing agent, 0.1-1 part of a thermal promoter, and 0.1-1 part of a leveling agent. The synchronization of the release of essential oil molecules with light/thermal curing promotes the essential oil molecules to be diffused to the interior of the sizing material more uniformly in a wider range, and during the curing and film forming of the nail sticker, an aroma spreads as tantalizing as that of baked food.

12 Claims, 2 Drawing Sheets

NAIL STICKER, COMPOSITION FOR NAIL STICKER AND METHOD FOR PREPARING COMPOSITION

FIELD OF THE INVENTION

The present invention relates to the technical field of nail make-up materials, and in particular, relates to a nail sticker, a composition for the nail sticker and a method for preparing the composition.

BACKGROUND OF THE INVENTION

With the social development and the advances in science and technology, people's living standards have improved continually, from which more spiritual pursuits arise. The beauty industry has also expanded along with the increase in the people's living standards. Manicure, as a beauty style regardless of age stage and gender, has drawn much attention in recent years. For a long time, manicure mainly involves painting finger or toe nails with pigmented nail polishes of various colors. However, the experience is poor since a long time is taken for drying. Compared with the nail polishes, nail stickers are more convenient to use, and have become popular nail ornaments in recent years.

A Korean Invention Patent with the Publication Number of KR1020170111293A discloses a UV-curable gel nail sticker, a method for producing a UV-curable gel and use of the UV-curable gel. The UV-curable gel nail sticker includes an UV-curable sticker that is subjected to UV curing and a bottom bonding layer, wherein the UV-curable sticker has a radian fitting a curved surface of a user's nail. When in use, the UV-curable sticker can stick to the user's nail via the bottom bonding layer.

For the patent described above, the inventor considered that the radian of the UV-curable sticker in the above patent could not fit the curved surface of the user's nail, such that the sticker could not perfectly stick to the surface of the user's nail, which has a negative effect on the appearance and meanwhile easily affects the fitting degree due to the formation of a gap.

SUMMARY OF THE INVENTION

In order to increase the fitting degree between a nail sticker and a nail surface and enhance the adhesion between the nail sticker and the nail, the present application provides a composition for a nail sticker and a method for preparing the same.

In a first aspect, the present application provides a composition for a nail sticker. The following technical solution is used:

a composition for a nail sticker is made of raw materials including a sizing material, and the sizing material is made of the following raw materials in parts by weight:
  45-85 parts of a UV thermosetting resin,
  2-9 parts of a photoinitiator,
  1.5-2 parts of a curing agent,
  0.1-1 part of a thermal promoter, and
  0.1-1 part of a leveling agent.

With the above technical solution, a bonded nail sticker may be produced. The nail sticker is stuck to a user's nail in a soft state before being cured, and may perfectly fit the curved radian of the nail surface to reduce gaps and bubbles that were possibly generated on the nail surface, and to enhance the adhesion between the nail sticker and the nail. The nail sticker is stuck to a nail and then subjected to UV thermal curing; and the nail sticker after being cured is firmly stuck to the nail in a glossy and hard state.

In addition, since the composition contains the UV thermosetting resin which is UV-curable and thermocurable and is available for synchronous UV curing and thermal curing, the curing speed of the composition of the nail sticker is accelerated, and the curing efficiency is increased. With the unique raw sizing materials and the ratio thereof in the technical solutions described above, the viscosity presented in the composition is improved, the tenacity, hardness and weatherability of the cured nail sticker are increased, and the film formed through curing is high in hardness, glossiness, heat resistance and adhesion, and has an edge that is less liable to wrinkling.

Optionally, the UV thermosetting resin is made of the following raw materials in parts by weight:
  10-15 parts of 2-hydroxyethyl methacrylate;
  15-35 parts of an epoxy resin;
  8-12 parts of isocyanate;
  10-15 parts of a polyester polyol;
  0.05-0.3 parts of a polymerization inhibitor;
  0.5-1 part of a silane coupling agent; and
  10-20 parts of an acrylate monomer.

With the above technical solution, the 2-hydroxyethyl methacrylate, the epoxy resin, the polyester polyol, and the acrylate monomer are used as resin binders; the isocyanate contains unsaturated bonds in its structure and has a high activity, whereby the isocyanate reacts with active groups in the above raw materials; the polymerization inhibitor may prevent polymerization to create an induction period in a polymerization process; and the silane coupling agent may increase the bonding performance of the UV thermosetting resin.

Optionally, a method for preparing the UV thermosetting resin includes the following steps: (1) mixing the 2-hydroxyethyl methacrylate, the epoxy resin, the isocyanate, the polymerization inhibitor and the silane coupling agent, uniformly stirring a resulting mixture for reacting for 2-4 hours under a condition of 30-50° C., and heating a resultant to 75-85° C. for reacting for 1-2 hours to obtain a substance A; and (2) mixing the substance A with the polyester polyol, heating a resulting mixture to 60-65° C. for reacting for 1-1.5 hours, then adding the acrylate monomer, and heating a resultant to 70-80° C. for reacting for 1-2 hours to obtain the UV thermosetting resin.

With the above technical solution, the resulting UV thermosetting resin is UV-curable and thermocurable, which is convenient to use and achieves a good mechanical property after curing.

Optionally, the raw materials of the composition further include a temperature-sensitive sustained-release essential oil microcapsule, and a weight ratio of the sizing material to the temperature-sensitive sustained-release essential oil microcapsule ranges from 100:1 to 100:5; and the temperature-sensitive sustained-release essential oil microcapsule includes a capsule core and a capsule wall wrapping the capsule core, the capsule core includes vegetable essential oil, and the capsule wall is made of the following raw materials in parts by weight:
  40-60 parts of N-isopropylacrylamide,
  10-20 parts of an epoxy resin,
  0.001-0.002 parts of potassium persulfate,
  2-4 parts of lauryl sodium sulfate, and
  polyurethane resin, where a total of the N-isopropylacrylamide, the epoxy resin, the potassium persulfate, the lauryl sodium sulfate, and the polyurethane resin is 100 parts by weight.

Since the sizing material may have some resin odors to affect the use experience of a user, the temperature-sensitive sustained-release essential oil microcapsule is added to the composition according to the present application in order to solve this problem. With the above technical solution, by combining the N-isopropylacrylamide as a temperature-sensitive polymer with the epoxy resin and the polyurethane resin and by taking the potassium persulfate as an initiator and the lauryl sodium sulfate as an emulsifier, the temperature-sensitive sustained-release capsule wall is prepared to wrap the vegetable essential oil therein as a capsule core. At normal temperature, the micropores in the capsule wall are small or closed; and when the temperature rises, the micropores in the capsule wall become bigger or open, and the vegetable essential oil inside the capsule wall is released slowly via the micropores in the capsule wall. According to the present application, the capsule wall having a sustained-release effect is prepared from a temperature-sensitive material. During production, the vegetable essential oil is wrapped inside the capsule wall and then added to the composition of the nail sticker. The composition is applied to a stainless plate and can slowly release an aroma while the temperature is slowly raised. Since the composition contains the UV thermosetting resin, the composition is UV-curable and thermocurable and is convenient to use.

Here, the temperature-sensitive sustained-release essential oil microcapsule is a nano-scale microcapsule with a particle size of 1-100 nm, and further of 10-50 nm. The temperature-sensitive sustained-release essential oil microcapsule of the present invention is made of a resin-adaptable material, which may be stably blended in a resin-based material to exert its own functions without reducing the performance of the resin-based material.

In addition, the combination of the temperature-sensitive sustained-release essential oil microcapsule with the sizing material, in particular the UV thermosetting resin, does not affect the light curing and/or thermal curing of the UV thermosetting resin. Moreover, due to the synchronization of the release of the essential oil from the capsule core in the microcapsule with the light curing and/or thermal curing of the UV thermosetting resin, this combination also promotes the release of the molecules of the essential oil into the sizing material, such that the essential oil is diffused more uniformly in a wider range to present a lasting aroma, thereby improving the comfort level of people.

Optionally, a method for preparing the temperature-sensitive sustained-release essential oil microcapsule includes: uniformly mixing the vegetable essential oil and a proper amount of ethanol, and homogenizing a resulting mixture to obtain a capsule core solution; mixing the N-isopropylacrylamide, the epoxy resin, the potassium persulfate, the lauryl sodium sulfate, and the polyurethane resin, and uniformly stirring a resulting mixture under a heating condition to obtain a capsule wall prepolymer; and adding the capsule core solution to the capsule wall prepolymer, and performing uniform stirring, suction filtration and drying on a resultant to obtain the temperature-sensitive sustained-release essential oil microcapsule.

With the above technical solution, the vegetable essential oil is dissolved in the ethanol and homogenized to form tiny droplets; the N-isopropylacrylamide, the epoxy resin, the potassium persulfate, the lauryl sodium sulfate, and the polyurethane resin react under heating to form a capsule wall prepolymer; and then, the droplets of the vegetable essential oil are wrapped by the capsule wall prepolymer, and dried and cured to obtain the temperature-sensitive sustained-release essential oil microcapsule.

Optionally, the vegetable essential is at least one selected from chamomile essential oil, osmanthus essential oil, clove essential oil, tea tree essential oil, jasmine essential oil, lemon essential oil, rose essential oil, lavender essential oil, lily essential oil, and green tea essential oil.

With the above technical solution, the above vegetable essential oil may be combined with the capsule wall material of the present application to prepare the temperature-sensitive sustained-release essential oil microcapsule. According to the preferences of people, the vegetable essential oil having a different aroma may be selected to obtain a composition of a different aroma, which improves the applicability of the composition.

Optionally, a raw-material weight ratio of the capsule core to the capsule wall is (100-150):100.

With the above technical solution, the aroma score and the total aroma release time may be better balanced at the above raw-material ratio. Therefore, the raw-material weight ratio of the capsule core to the capsule wall is preferably (100-150):100.

Optionally, wheat carbon black is further added to the capsule core solution, and a weight ratio of the white carbon black to the vegetable essential oil is (12-24):120.

With the above technical solution, the white carbon black, due to many internal micropores and oil absorbency, may absorb a part of the vegetable essential oil and coordinate with the capsule wall to further control the sustained release of the vegetable essential oil. Meanwhile, the white carbon black has a little effect on the color of the composition. When an excessive amount of the white carbon black is added, the release rate of the vegetable essential oil is too slow; and when a small amount of the white carbon black is added, the increase in the aroma score and the total aroma release time is slight, such that an expected effect can hardly be achieved. Therefore, the weight ratio of the white carbon black to the vegetable essential oil is preferably (12-24):120.

Optionally, in the step of homogenizing, the homogenizing is performed for 2-5 min at a revolving speed of 10,000-12,000 r/min under a pressure of 600-800 bar.

With the above technical solution, in the case of excessively low homogenizing pressure, the molecules of the vegetable essential oil would be excessively large in particle size, and thus may hardly pass through the micropores in the capsule wall, such that the release rate of aroma is too slow; and in the case of excessively high homogenizing pressure, the molecules of the vegetable essential oil would be excessively small in particle size, such that the release rate of aroma is too fast. In the case of excessively short homogenizing time, the vegetable essential oil would be homogenized in completely; and in the case of excessively long homogenizing time, the increase in the aroma score and total aroma release time of the composition is slight, and the cost increases. Therefore, in the step of homogenizing, the homogenizing time is preferably 2-5 min, and the pressure is preferably 600-800 bar.

In a second aspect, the present application provides a method for preparing a composition for a nail sticker. The following technical solution is used:

a method for preparing a composition for a nail sticker includes the following steps: uniformly mixing a UV thermosetting resin, a photoinitiator, a curing agent, a thermal promoter and a leveling agent to obtain the composition for the nail sticker.

With the above technical solution, since the composition contains the UV thermosetting resin which is UV-curable and thermocurable and is available for synchronous UV curing and thermal curing, the curing speed of the composition of the nail sticker is accelerated, and the curing efficiency is increased. With the unique raw sizing materials and the ratio thereof in the technical solutions described above, the viscosity presented in the composition is improved, the tenacity, hardness and weatherability of the cured nail sticker are increased, and the film formed through curing is high in hardness, glossiness, heat resistance and adhesion, and has an edge that is less liable to wrinkling. The composition in the present application may act as a protective film layer, a glossy layer, a sizing layer or an adhesive layer, etc.

In a third aspect, the present application provides a nail sticker. The following technical solution is used:

a nail sticker includes a carrier and an adhesive layer on a surface of the carrier, wherein the carrier is of a layer structure, and at least one layer of the carrier has the composition for the nail sticker as defined in any one of the previously described embodiments.

With the above technical solution, at least one layer in the carrier contains the previously defined composition for the nail sticker; and the nail sticker may stick to a user's nail in a soft state before UV thermal curing, and perfectly fit the curved radian of the nail surface to reduce gaps and bubbles that were possibly generated on the nail surface, and to enhance the adhesion between the nail sticker and the nail. After the nail sticker is stuck to a nail and then subjected to UV thermal curing, the cured nail sticker is firmly stuck to the nail in a glossy and hard state.

Optionally, the adhesive layer has microporous particles and is of a microporous structure, and the microporous particles are connected to an external environment via the microporous structure of the adhesive layer.

With the above technical solution, the air between the surface of a human tissue and the outside can be ventilated via the micropores in the microporous structure and the microporous particles on the adhesive layer, and the adhesive achieves good air permeability. The adhesive layer has good air permeability, which is helpful to discharge the exocrine substances evaporated or volatilized on the surface of the human tissue, keeping the surface of the human tissue and the surface of the adhesive layer clean and dry and the adhesive layer firmly stuck, such that the carrier can be persistently and effectively attached to the surface of the human body.

In particular, during the process of UV thermal curing, the secretion of oil, lipids, sweat, exfoliated keratinocytes or the like from the surface of the human tissue is accelerated under the action of heat and the like, and these secreta may affect the adhesion between the adhesive layer and the surface of the human tissue. The air-permeable adhesive layer is helpful for the evaporation or volatilization of the secreta, and further provides channels for discharging the secreta, thereby keeping the surface of the human tissue clean and dry and enhancing the durability of the nail sticker.

Optionally, an insulating layer is disposed between the carrier and the adhesive layer.

With the above technical solution, the insulating layer has an effect of supporting the carrier to improve the connection force between the carrier and the adhesive layer, and to further prevent the material or pigment in the carrier from infiltration, thereby keeping the stability of the shape, pattern and color in the carrier.

Optionally, the microporous particles are one or more of activated carbon particles, silicon dioxide particles, coral sand particles or zeolite particles.

Optionally, the microporous particles are uniformly dispersed in the adhesive layer; or the microporous particles form a layer located in the adhesive layer.

With the above technical solution, the microporous particles are uniformly dispersed in the adhesive layer to ensure the uniformity of the overall structure of the adhesive layer, where the microporous structure is uniform in distribution and even in air permeability, such that excellent air permeability is achieved, which is helpful for the evaporation or volatilization of the secreta and the like.

Optionally, a surface of the adhesive layer away from the carrier is provided with an air-permeable substrate.

With the above technical solution, after the adhesive layer is applied to the air-permeable substrate, air directly passes through micropores in the air-permeable substrate per se and the air-permeable micropores formed in the adhesive layer during application, and then reaches a back surface of the air-permeable substrate, thereby achieving the purpose of ventilation.

Optionally, the layer structure of the carrier includes one or more of a pattern layer, a color layer, a hot stamping layer, a coating layer, a gloss oil layer and a decoration layer, and a topmost layer of the carrier is further provided with a varnish layer.

With the above technical solution, the carrier is formed by any combination of the pattern layer, the color layer, the hot stamping layer, the coating layer, the gloss oil layer and the decoration layer, and may achieve various functions.

In summary, the present application has the following beneficial effects:

1. Since the nail sticker prepared from the composition according to the present application is stuck to a user's nail in a soft state before being cured, it can perfectly fit the curved radian of the nail surface to reduce gaps and bubbles that are possibly generated on the nail surface, and to enhance the adhesion between the nail sticker and the nail. The nail sticker is stuck to a nail and then subjected to UV thermal curing, and the cured nail sticker is firmly stuck to the nail in a glossy and hard state.

2. Since the composition according to the present application contains the UV thermosetting resin which is UV-curable and thermocurable and is available for synchronous UV curing and thermal curing, the curing speed of the composition of the nail sticker is accelerated, and the curing efficiency is increased. With the unique raw sizing materials and the ratio thereof in the technical solutions described above, the viscosity presented in the composition is improved, the tenacity, hardness and weatherability of the cured nail sticker are increased, and the film formed through curing is high in hardness, glossiness, heat resistance and adhesion, and has an edge that is less liable to wrinkling.

3. In the composition according to the present application, by combining the N-isopropylacrylamide with the epoxy resin and the polyurethane resin and taking the potassium persulfate as an initiator and the lauryl sodium sulfate as an emulsifier, the temperature-sensitive sustained-release capsule wall is prepared to wrap the vegetable essential oil therein as a capsule core. At normal temperature, the micropores in the capsule wall are small or closed; and when the temperature rises, the micropores in the capsule wall become bigger or open, and the vegetable essential oil inside the capsule wall is released slowly via the micropores in the capsule wall. According to the present application, the capsule wall having a sustained-release effect is prepared from a temperature-sensitive material. During production, the vegetable essential oil is wrapped inside the capsule wall and then added to the composition of the nail sticker. The composition is applied to a stainless plate and can slowly release an aroma while the temperature is slowly raised.

4. Since the adhesive layer in the nail sticker according to the present application is of a microporous structure and also has microporous particles having micropores, and the air between the surface of a human tissue and the outside can ventilated via these micropores in the microporous structure and the microporous particles, thereby achieving good air permeability. The exocrine substances on the surface of the human tissue can be evaporated or volatilized and then discharged through the microporous structure, to keep the surface of the human tissue and the surface of the adhesive layer clean and dry and the adhesive layer firmly stuck, such that the carrier can be persistently and effectively attached to the surface of the human body.

5. Since the insulating layer disposed in the nail sticker of the present application has an effect of supporting the carrier, the connection force between the carrier and the adhesive layer is increased, the material or pigment in the carrier can be further prevented from infiltration, thereby keeping the stability of the shape, pattern and color in the carrier.

BRIEF DESCRIPTION OF THE SEVERAL VIEWS OF THE DRAWINGS

To describe the technical solutions in the embodiments of the present invention more clearly, the following briefly introduces the accompanying drawings required for describing the embodiments. Obviously, the accompanying drawings in the following description show merely some embodiments of the present invention, and a person of ordinary skills in the art may still derive other drawings from these accompanying drawings without creative efforts.

DESCRIPTION OF REFERENCE SIGNS 1, carrier; 2, adhesive layer; 3, microporous particle; 4, air-permeable substrate; 5, insulating layer; 6, release protective film; 7, release film; 1a, gloss oil layer; 1b, color layer; 1c, hot stamping layer; 1d, decoration layer; 1e, varnish layer; and 10, release film.

DETAILED DESCRIPTION OF THE INVENTION

The present application will be further described in detail below in conjunction with embodiments.

Preparation Examples of Raw Materials

Preparation Example 1

A temperature-sensitive sustained-release essential oil microcapsule included a capsule core and a capsule wall wrapping the capsule core. The capsule core included 80 parts of vegetable essential oil, which was chamomile essential oil. The capsule wall was made of the following raw materials in parts by weight:

40 parts of N-isopropylacrylamide;
20 parts of a bisphenol-A epoxy resin E-44;
0.001 part of potassium persulfate;
2 parts of lauryl sodium sulfate; and
37.999 parts of a polyurethane resin. Each part described above had a weight of 1 g, and the polyurethane resin was polyurethane resin emulsion SYNTEGRA YB-2000 purchased from DOW Chemical.

A method for preparing the temperature-sensitive sustained-release essential oil microcapsule was as follows: the vegetable essential oil and a proper amount of ethanol were uniformly mixed, and homogenized by a high-pressure homogenizer for 6 min at a revolving speed of 9000 r/min under a pressure of 600 bar to obtain a capsule core solution; the N-isopropylacrylamide, the epoxy resin, the potassium persulfate, the lauryl sodium sulfate, and the polyurethane resin were mixed, heated to 50° C., and stirred for 2 h to obtain a capsule wall prepolymer; and the capsule core solution was added to the capsule wall prepolymer, and uniform stirring, suction filtration and drying were performed to obtain the temperature-sensitive sustained-release essential oil microcapsule.

Preparation Example 2

A temperature-sensitive sustained-release essential oil microcapsule included a capsule core and a capsule wall wrapping the capsule core. The capsule core included 80 parts of vegetable essential oil, which was chamomile essential oil. The capsule wall was made of the following raw materials in parts by weight:

50 parts of N-isopropylacrylamide;
15 parts of a bisphenol-A epoxy resin E-44;
0.0015 part of potassium persulfate;
3 parts of lauryl sodium sulfate; and
31.985 parts of a polyurethane resin. Each part described above had a weight of 1 g, and the polyurethane resin was polyurethane resin emulsion SYNTEGRA YB-2000 purchased from DOW Chemical.

A method for preparing the temperature-sensitive sustained-release essential oil microcapsule was as follows: the vegetable essential oil and a proper amount of ethanol were uniformly mixed, and homogenized by a high-pressure homogenizer for 6 min at a revolving speed of 9000 r/min under a pressure of 600 bar to obtain a capsule core solution; the N-isopropylacrylamide, the epoxy resin, the potassium persulfate, the lauryl sodium sulfate, and the polyurethane resin were mixed, heated to 55° C., and stirred for 1.5 h to obtain a capsule wall prepolymer; and the capsule core solution was added to the capsule wall prepolymer, and uniform stirring, suction filtration and drying were performed to obtain the temperature-sensitive sustained-release essential oil microcapsule.

Preparation Example 3

A temperature-sensitive sustained-release essential oil microcapsule included a capsule core and a capsule wall wrapping the capsule core. The capsule core included 80 parts of vegetable essential oil, which was chamomile essential oil. The capsule wall was made of the following raw materials in parts by weight:

60 parts of N-isopropylacrylamide;
10 parts of a bisphenol-A epoxy resin E-44;

0.002 part of potassium persulfate;
4 parts of lauryl sodium sulfate; and
25.998 parts of a polyurethane resin. Each part described above had a weight of 1 g, and the polyurethane resin was polyurethane resin emulsion SYNTEGRA YB-2000 purchased from DOW Chemical.

A method for preparing the temperature-sensitive sustained-release essential oil microcapsule was as follows: the vegetable essential oil and a proper amount of ethanol were uniformly mixed, and homogenized by a high-pressure homogenizer for 6 min at a revolving speed of 9000 r/min under a pressure of 600 bar to obtain a capsule core solution; the N-isopropylacrylamide, the epoxy resin, the potassium persulfate, the lauryl sodium sulfate, and the polyurethane resin were mixed, heated to 60° C., and stirred for 1 h to obtain a capsule wall prepolymer; and the capsule core solution was added to the capsule wall prepolymer, and uniform stirring, suction filtration and drying were performed to obtain the temperature-sensitive sustained-release essential oil microcapsule.

Preparation Example 4

A temperature-sensitive sustained-release essential oil microcapsule in this example was different from that in Preparation Example 2 in that the capsule core included 100 parts of vegetable essential oil.

Preparation Example 5

A temperature-sensitive sustained-release essential oil microcapsule in this example was different from that in Preparation Example 2 in that the capsule core included 120 parts of vegetable essential oil.

Preparation Example 6

A temperature-sensitive sustained-release essential oil microcapsule in this example was different from that in Preparation Example 2 in that the capsule core included 150 parts of vegetable essential oil.

Preparation Example 7

A temperature-sensitive sustained-release essential oil microcapsule in this example was different from that in Preparation Example 2 in that the capsule core included 170 parts of vegetable essential oil.

Preparation Example 8

A temperature-sensitive sustained-release essential oil microcapsule included a capsule core and a capsule wall wrapping the capsule core. The capsule core included 120 parts of vegetable essential oil, which was chamomile essential oil. The capsule wall was made of the following raw materials in parts by weight:
50 parts of N-isopropylacrylamide;
15 parts of a bisphenol-A epoxy resin E-44;
0.0015 part of potassium persulfate;
3 parts of lauryl sodium sulfate; and
31.985 parts of a polyurethane resin. Each part had a weight of 1 g, and the polyurethane resin was polyurethane resin emulsion SYNTEGRA YB-2000 purchased from DOW Chemical.

A method for preparing the temperature-sensitive sustained-release essential oil microcapsule was as follows: the vegetable essential oil and a proper amount of ethanol were uniformly mixed, and homogenized by a high-pressure homogenizer for 6 min at a revolving speed of 9000 r/min under a pressure of 600 bar, and 12 parts of white carbon black were added and uniformly stirred to obtain a capsule core solution; the N-isopropylacrylamide, the epoxy resin, the potassium persulfate, the lauryl sodium sulfate, and the polyurethane resin were mixed, heated to 55° C., and stirred for 1.5 h to obtain a capsule wall prepolymer; and the capsule core solution was added to the capsule wall prepolymer, and uniform stirring, suction filtration and drying were performed to obtain the temperature-sensitive sustained-release essential oil microcapsule.

Preparation Example 9

A temperature-sensitive sustained-release essential oil microcapsule in this example was different from that in Preparation Example 8 in that, after the vegetable essential oil and a proper amount of ethanol were uniformly mixed and homogenized by the high-pressure homogenizer, 18 parts of white carbon black were added and uniformly stirred to obtain a capsule core solution.

Preparation Example 10

A temperature-sensitive sustained-release essential oil microcapsule in this example was different from that in Preparation Example 8 in that, after the vegetable essential oil and a proper amount of ethanol were uniformly mixed and homogenized by the high-pressure homogenizer, 24 parts of white carbon black were added and uniformly stirred to obtain a capsule core solution.

Preparation Example 11

A temperature-sensitive sustained-release essential oil microcapsule in this example was different from that in Preparation Example 8 in that, after the vegetable essential oil and a proper amount of ethanol were uniformly mixed and homogenized by the high-pressure homogenizer, 6 parts of white carbon black were added and uniformly stirred to obtain a capsule core solution.

Preparation Example 12

A temperature-sensitive sustained-release essential oil microcapsule in this example was different from that in Preparation Example 8 in that, after the vegetable essential oil and a proper amount of ethanol were uniformly mixed and homogenized by the high-pressure homogenizer, 36 parts of white carbon black were added and uniformly stirred to obtain a capsule core solution.

Preparation Example 13

A temperature-sensitive sustained-release essential oil microcapsule in this example was different from that in Preparation Example 9 in that the homogenization was performed for 6 min under a pressure of 600 bar.

Preparation Example 14

A temperature-sensitive sustained-release essential oil microcapsule in this example was different from that in Preparation Example 9 in that the homogenization was performed for 6 min under a pressure of 800 bar.

Preparation Example 15

A temperature-sensitive sustained-release essential oil microcapsule in this example was different from that in Preparation Example 9 in that the homogenization was performed for 6 min under a pressure of 1000 bar.

Preparation Example 16

A temperature-sensitive sustained-release essential oil microcapsule in this example was different from that in Preparation Example 9 in that the homogenization was performed for 5 min under a pressure of 600 bar.

Preparation Example 17

A temperature-sensitive sustained-release essential oil microcapsule in this example was different from that in Preparation Example 9 in that the homogenization was performed for 2 min under a pressure of 800 bar.

Comparative Preparation Example 1

A temperature-sensitive sustained-release essential oil microcapsule in this example was different from that in Preparation Example 2 in that the bisphenol-A epoxy resin E-44 was substituted with polyurethane resin of an equal weight.

Comparative Preparation Example 2

A temperature-sensitive sustained-release essential oil microcapsule in this example was different from that in Preparation Example 2 in that 30 parts of the N-isopropylacrylamide were used, and 51.985 parts of the polyurethane resin were used.

Embodiment

Embodiment 1

A composition for a nail sticker was made of raw materials including a sizing material and a temperature-sensitive sustained-release essential oil microcapsule. A weight ratio of the sizing material to the temperature-sensitive sustained-release essential oil microcapsule is 100:1.

The sizing material was made of the following raw materials in parts by weight:
45 parts of a UV thermosetting resin;
2 parts of a photoinitiator;
1.5 parts of a curing agent;
0.1 part of a thermal promoter; and
0.1 part of a leveling agent. Each part described above had a weight of 1 g.

An adhesive nail sticker might be produced. The nail sticker was stuck to a user's nail in a soft state before being cured, and might perfectly fit the curved radian of the nail surface to reduce gaps and bubbles that were possibly generated on the nail surface, and to enhance the adhesion between the nail sticker and the nail. The nail sticker is stuck to a nail and then subjected to UV thermal curing; and the nail sticker after being cured is firmly stuck to the nail in a glossy and hard state.

Specifically, the photoinitiator may be a UV initiator or a visible-light photoinitiator, and in particular, may be one or more of benzoin and a derivative thereof, benzophenone or a derivative thereof, and the like. According to different needs, a corresponding photoinitiator is added. Specifically, the photoinitiator is one or more selected from 1-hydroxycyclohexyl phenyl ketone, benzoyl peroxide, dicumyl peroxide, azodiisobutyronitrile, azobisisoheptanenitrile, N,N-dimethylaniline, ammonium persulfate, and sodium sulfite. The source of the photoinitiator is not limited in the present invention, and those skilled in the art may purchase any photoinitiator that is known and available in the market. When the sizing material is cured under light, the photoinitiator described above according to the present invention can promote a light curing reaction to increase the degree of cure.

The curing agent may be one or more of an amine curing agent, an epoxy curing agent and the like. Specifically, the curing agent is one or more selected from triethylene diamine, zinc isooctanoate, and aluminum acetylacetonate. According to different needs, a corresponding curing agent is added. The source of the photoinitiator is not limited in the present invention, and those skilled in the art may purchase any photoinitiator that is known and available in the market. As an indispensable additive for the curing reaction of the sizing material, the curing agent descried above according to the present invention participates in the curing reaction and changes properties such as mechanical property, heat resistance, waterproofness, and corrosion resistance of the cured nail sticker.

The thermal promoter is one or more of aliphatic amines, aromatic amines, metal carboxylate and the like. According to different needs, a corresponding thermal promoter is added. The source of the photoinitiator is not limited in the present invention, and those skilled in the art may purchase any photoinitiator that is known and available in the market. When the sizing material is cured under heating, the thermal promoter described above according to the present invention can promote a thermal curing reaction to reduce the curing temperature and increase the degree of cure.

The leveling agent is one or more selected from a BYK® 333 type leveling agent, MOK® 8217 type leveling agent from German, TEGO® 432 type leveling agent, GLIDE® 450 type leveling agent, LENCOLO® 3109 type leveling agent, and ECO®-3750 type leveling agent. The source of the photoinitiator is not limited in the present invention, and those skilled in the art may purchase any photoinitiator that is known and available in the market. The leveling agent described above according to the present invention allows the sizing material to level uniformly and smoothly.

In the above sizing material, a variety of additives may be added as required, including, such as a thermal polymerization inhibitor, an antioxidant, an ultraviolet sensitizer, a preservative, phosphate and other flame retardants, a surfactant, an antistatic agent, a pigment, a colorant such as a dye, a perfume, a defoaming agent, a filler, a silane coupling agent, a surface tension modifier, a plasticizer, a surface lubricant, a softener, an organic filler, an inorganic filler, etc. The addition amounts of these other components are not particularly limited as long as they have no adverse effect on the properties exhibited by the composition for the nail sticker according to the present invention.

Specifically, in Embodiment 1, the photoinitiator was 1-hydroxycyclohexyl phenyl ketone; the curing agent was triethylene diamine; the thermal promoter was zinc octoate; and the leveling agent was a BYK® 333 type leveling agent.

The UV thermosetting resin was made of the following raw materials in parts by weight:
  12 parts of 2-hydroxyethyl methacrylate;
  25 parts of an epoxy resin;
  10 parts of isocyanate;
  12 parts of a polyester polyol;
  0.2 parts of a polymerization inhibitor;
  0.8 parts of a silane coupling agent; and
  15 parts of an acrylate monomer.

2-Hydroxyethyl methacrylate (HEMA) is an organic compound with a molecular formula of C6H10O3 and a molecular weight of 130.1418. it is a colorless transparent free-running liquid that is frequently used in the synthesis of medical polymer materials, thermosetting coatings, binders and the like.

The epoxy resin is one or more of a bisphenol-A epoxy resin or a homologue thereof, a phenolic epoxy resin, a tetrabromobisphenol-A epoxy resin, a bisphenol-F epoxy resin, a naphthalene epoxy resin, an cycloaliphatic epoxy resin and the like.

The isocyanate may be monoisocyanate R—N═C═O, diisocyanate O═C═N—R—N═C═O and polyisocyanate, and common diisocyanates include toluene diisocynate (TDI), hexamethylene diisocyanate (HDI), diphenylmethane diisocyanate (MDI), isophorone diisocyanate (IPDI), dicyclohexylmethane diisocyanate (HMID), phenylene diisocyanate (PPDI) and the like.

The polyester polyol is one or more of a conventional polyester polyol, a polycaprolactone polyol, and polycarbonate diol. More specifically, the molecular weight of the polyester polyol is 1500-2400, with butyl as a pendant group.

The polymerization inhibitor is one or more of p-hydroxyanisole, hydroquinone, 2,6-di-tert-butyl-p-cresol, 2,5-di-tert-butyl-hydroquinone, 2-tert-butyl-hydroquinone, p-benzoquinone, methylhydroquinone and the like.

The silane coupling agent is one or more of γ-aminopropyltriethoxysilane, γ-methacryloxy propyl trimethoxyl silane, γ-(2,3-epoxypropoxy)aminopropyltrimethoxysilane, γ-thiopropyl triethoxy silane, and γ-aminoethyl aminopropyl trimethoxysilane.

The acrylic monomer is one or more of acrylic acid, methyl acrylate, ethyl acrylate, n-butyl acrylate, isobutyl acrylate, tert-butyl acrylate, 2-hydroxyethyl acrylate, 2-hydroxypropyl acrylate, 2-hydroxypropyl acrylate, 2-ethoxyethyl acrylate, 2-cyanoethyl acrylate, cyclohexyl acrylate, bornyl acrylate and the like.

Specifically, in Embodiment 1, the epoxy resin was bisphenol-A epoxy resin E-44;
  the isocyanate was isophorone diisocyanate;
  the polyester polyol was a polycaprolactone polyol with a molecular weight of 2000;
  the polymerization inhibitor was 2,6-di-tert-butyl-4-methylphenol;
  the silane coupling agent was methyl(trifluoroacetyl)silane; and
  the acrylate monomer was n-butyl acrylate.

A method for preparing the UV thermosetting resin included the following steps: (1) the 2-hydroxyethyl methacrylate, the epoxy resin, the isocyanate, the polymerization inhibitor and the silane coupling agent were mixed and uniformly stirred for reacting for 3 hours under a condition of 40° C., and a resultant was heated to 80° C. for reacting for 1.5 hours to obtain a substance A; and (2) the substance A the polyester polyol were mixed and heated to 60° C. for reacting for 1.5 hours, then the acrylate monomer was added, and a resultant was heated to 75° C. for reacting for 1.5 hours to obtain the UV thermosetting resin.

A method for preparing the composition for the nail sticker included the following steps: the UV thermosetting resin, the photoinitiator, the curing agent, the thermal promoter and the leveling agent were uniformly mixed; and the temperature-sensitive sustained-release essential oil microcapsule prepared from Preparation Example 1 was added and uniformly mixed to obtain the composition for the nail sticker.

Embodiments 2 to 17

A composition for a nail sticker in each of these embodiments was different from that in Embodiment 1 in that the temperature-sensitive sustained-release essential oil microcapsule was prepared from Preparation Examples 2 to 17.

Embodiment 18

A composition for a nail sticker in this embodiment was different from that in Embodiment 1 in that the sizing material was made of the following raw materials in parts by weight:
  60 parts of a UV thermosetting resin;
  6 parts of a photoinitiator;
  1.8 parts of a curing agent;
  0.5 part of a thermal promoter; and
  0.5 part of a leveling agent.

Embodiment 19

A composition for a nail sticker in this embodiment was different from that in Embodiment 1 in that the sizing material was made of the following raw materials in parts by weight:
  85 parts of a UV thermosetting resin;
  9 parts of a photoinitiator;
  2 parts of a curing agent;
  1 part of a thermal promoter; and
  1 part of a leveling agent.

Embodiment 20

A composition for a nail sticker in this embodiment was different from that in Embodiment 1 in that the temperature-sensitive sustained-release essential oil microcapsule was not added to the raw materials of the composition, and the UV thermosetting resin was 65 parts in weight.

Embodiment 21

A composition for a nail sticker in this embodiment was different from that in Embodiment 1 in that the temperature-sensitive sustained-release essential oil microcapsule was not added to the raw materials of the composition, and the UV thermosetting resin was 85 parts in weight.

Embodiment 22

A composition for a nail sticker in this embodiment was different from that in Embodiment 1 in that the sizing material was made of the following raw materials in parts by weight:
  45 parts of a UV thermosetting resin;
  9 parts of a photoinitiator;
  2 parts of a curing agent;

1 part of a thermal promoter; and
1 part of a leveling agent.

Comparative Examples

Comparative Example 1

A composition for a nail sticker in this comparative example was different from that in Embodiment 1 in that the temperature-sensitive sustained-release essential oil microcapsule was not added to the raw materials of the composition.

Comparative Example 2

A composition for a nail sticker was made of raw materials including 100 parts of a sizing material and 1 part of chamomile essential oil. The sizing material was made of the following raw materials in parts by weight:
45 parts of a UV thermosetting resin;
2 parts of a photoinitiator;
1.5 parts of a curing agent;
0.1 part of a thermal promoter; and
0.1 part of a leveling agent. Each part described above had a weight of 1 g.

Furthermore, the photoinitiator is 1-hydroxycyclohexyl phenyl ketone; the curing agent is triethylene diamine; the thermal promoter is zinc octoate; and the leveling agent is a BYK® 333 type leveling agent.

The UV thermosetting resin was made of the following raw materials in parts by weight:
12 parts of 2-hydroxyethyl methacrylate;
25 parts of an epoxy resin which was in particular bisphenol-A epoxy resin E-44;
10 parts of isocyanate, which was in particular isophorone diisocyanate;
12 parts of a polyester polyol, which was in particular a polycaprolactone polyol with a molecular weight of 2000;
0.2 parts of a polymerization inhibitor, which was in particular 2,6-di-tert-butyl-4-methylphenol;
0.8 parts of a silane coupling agent, which was in particular methyl tris(trifluoroacetoxy)silane; and
15 parts of an acrylate monomer, which was n-butyl acrylate.

A method for preparing the UV thermosetting resin included the following steps: (1) the 2-hydroxyethyl methacrylate, the epoxy resin, the isocyanate, the polymerization inhibitor and the silane coupling agent were mixed and uniformly stirred for reacting for 3 hours under a condition of 40° C., and a resultant was heated to 80° C. for reacting for 1.5 hours to obtain a substance A; and (2) the substance A the polyester polyol were mixed and heated to 60° C. for reacting for 1.5 hours, then the acrylate monomer was added, and a resultant was heated to 75° C. for reacting for 1.5 hours to obtain the UV thermosetting resin.

A method for preparing a composition for a nail sticker included the following steps: the UV thermosetting resin, the photoinitiator, the curing agent, the thermal promoter and the leveling agent were uniformly mixed; and the chamomile essential oil was added and uniformly mixed to obtain the composition for the nail sticker.

Comparative Example 3

A composition for a nail sticker in this comparative example was different from that in Embodiment 1 in that the temperature-sensitive sustained-release essential oil microcapsule was prepared from Comparative Preparation Example 1.

Comparative Example 4

A composition for a nail sticker in this comparative example was different from that in Embodiment 1 in that the temperature-sensitive sustained-release essential oil microcapsule was prepared from Comparative Preparation Example 2.

Comparative Example 5

A composition for a nail sticker in this comparative example was different from that in Comparative Example 1 in that the sizing material was made of the following raw materials in parts by weight:
45 parts of the UV curable resin, which is a polyester polyurethane acrylate resin, i.e., DSM hexafunctional polyurethane acrylate 230A2 purchased from Shanghai Kaizhi New Materials Technology Co., Ltd.
2 parts of a photoinitiator;
1.5 parts of a curing agent;
0.1 part of a thermal promoter; and
0.1 part of a leveling agent.

Comparative Example 6

A composition for a nail sticker in this comparative example was different from that in Comparative Example 1 in that the sizing material was made of the following raw materials in parts by weight:
45 parts of a bisphenol-A epoxy resin E-44;
1.5 parts of a curing agent;
0.1 part of a thermal promoter; and
0.1 part of a leveling agent.

Performance Test (1) Physical and Chemical Performance Test

The compositions obtained from Embodiments 1 to 3 and 20 to 22 and Comparative Examples 1, 5 and 6 were evenly coated on a stainless-steel plate respectively by using a film coater. The coating property was evaluated visually according to the following scoring criteria, with the results shown in Table 1.

1. Coating Property 85-100: There was no stringiness during coating and no coating mark after coating, and a smooth coating film was formed.

64-84: There was slight stringiness identified during coating or slight coating marks identified after coating, the coating marks disappeared after standing for 30 seconds, and a smooth coating film was formed.

30-59: There was little stringiness identified during coating or few coating marks identified after coating, and the coating marks were still identified after standing for 30 seconds.

0-29: There was stringiness identified during coating or coating marks identified after coating, and a uniform coating film was not obtained.

2. Curing Property

The compositions obtained from Embodiments 1 to 3 and Comparative Examples 1, 5 and 6 were evenly coated on a stainless-steel plate respectively by using a film coater, and irradiated for 1 min with a special UV lamp for manicure. The surface of a cured film was touched with a finger to evaluate the degree of conglutination and determine the presence of uncured components.

85-100: There was no conglutination at all (complete curing).

60-84: There was little conglutination without finger marks remained on the surface (nearly complete curing, where the uncured components need no wiping).

30-59: There was conglutination with finger marks remained on the surface (incomplete curing, where the uncured components need wiping).

0-29: There was serious conglutination with the finger stuck to the surface (there were many uncured components remained, and the cured film was not available).

3. Glossiness

The cured film (namely, a gel nail) obtained from the curing property evaluation was observed visually to determine the glossiness.

85-100: There was surface gloss.

60-84: The reflected light could be identified, but turbidity was vaguely observed.

30-59: The entire surface was slightly turbid.

0-29: The surface was turbid.

4. Adhesion (Surface Hardness)

The cured film (namely, the gel nail) obtained from the curing property evaluation was scribed with a pencil of F hardness under a certain load, to evaluate the presence of peeling and scratches according to the following evaluation criteria.

85-100: No scratches and peeling. The surface hardness is more than the F hardness of the pencil.

60-84: No peeling occurred, but there were scratches that were naturally repaired over time.

30-59: No peeling occurred, but there were scratches that were not repaired.

0-29: Peeling occurred.

5. Durability

The cured film (namely, the gel nail) obtained from the curing property evaluation was used in daily life for two weeks to visually identify the appearance change of the film.

85-100: No appearance change.

60-84: There was slight damage, but the film remained clung to the stainless-steel plate.

30-59: There was a damaged part or a part slightly peeled off from the stainless-steel plate.

0-29: There was significant damage or peeling.

6. Storage Stability

The compositions obtained from Embodiments 1 to 3 and Comparative Examples 1, 5 and 6 were placed in a light-proof spiral tube with a lid closed. The spiral tube was stored under two conditions, namely, at 40° C. for one month and at 80° C. for two weeks. The stability during storage was evaluated by identifying if the viscosity of the liquid increased or decreased after storage.

85-100: The viscosity did not increase after the storage under two conditions, namely, at 40° C. for one month and at 80° C. for two weeks.

60-84: The increased viscosity was identified after the storage under either of the two conditions, namely, at 40° C. for one month and at 80° C. for two weeks.

0-59: The increased viscosity was identified after the storage under both of the two conditions, namely, at 40° C. for one month and at 80° C. for two weeks.

TABLE 1

Test results of Embodiments 1 to 3 and 20 to 22 and Comparative Examples 1, 5 and 6

| Embodiment | Coating property | Curing property | Glossiness | Adhesion | Durability | Storage stability |
|---|---|---|---|---|---|---|
| Embodiment 1 | 94 | 98 | 93 | 89 | 92 | 92 |
| Embodiment 2 | 90 | 95 | 94 | 91 | 94 | 93 |
| Embodiment 3 | 92 | 94 | 94 | 90 | 95 | 90 |
| Embodiment 20 | 95 | 98 | 95 | 95 | 89 | 96 |
| Embodiment 21 | 95 | 95 | 96 | 93 | 81 | 94 |
| Embodiment 22 | 96 | 98 | 96 | 90 | 84 | 93 |
| Comparative Example 1 | 97 | 98 | 98 | 95 | 87 | 95 |
| Comparative Example 5 | 65 | 42 | 52 | 72 | 78 | 94 |
| Comparative Example 6 | 71 | 45 | 36 | 74 | 73 | 95 |

In combination with Embodiments 1 to 3 and 20 to 22 and Comparative Examples 1, 5 and 6 and with reference to Table 1, it can be seen that, in the case that the sizing material in the present invention contains the foregoing UV thermosetting resin, the composition for the nail sticker can achieve satisfactory coating property, curing property and storage stability. In addition, by the light curing or thermal curing of the UV thermosetting resin, a gel nail sticker having both softness and tenacity could be formed with excellent glossiness, adhesion, surface hardness and durability.

In the case that the sizing material in the present invention contains the foregoing UV thermosetting resin, the addition of the foregoing temperature-sensitive sustained-release essential oil microcapsule has no adverse effect on the light curing and/or thermal curing of the UV thermosetting resin, but further increases the glossiness, surface hardness, durability, peelability and the like of the gel nail sticker formed after curing.

(2) Aroma Property Test

A stainless-steel plate was scrubbed and cleaned with anhydrous alcohol and dried for later use. The compositions from Embodiments 1 to 19 and Comparative Examples 1 to 4 each were uniformly coated on the stainless-steel plate, irradiated for 2 min on an irradiation region of the special UV lamp for manicure, and then placed in a glass bottle at a constant temperature of 35° C. 10 professional aroma assessors were chosen to score the compositions from Embodiments 1 to 19 and Comparative Examples 1 to 4 in sequence. The scores were averaged.

The scoring criteria of the aroma property were as follows:

70-100: Moderate and harmonious aroma unique to the essential oil.

30-69: Strong or light aroma of the essential oil.

0-29: Inharmonious aroma with an obvious smell of the resin.

A stainless-steel plate was scrubbed and cleaned with anhydrous alcohol and dried for later use. The compositions from Embodiments 1 to 19 and Comparative Examples 1 to 4 each were uniformly coated on the stainless-steel plate, irradiated for 2 min on an irradiation region of the special UV lamp for manicure, and then placed in a glass bottle at a constant temperature of 35° C. The time was started.

Professional aroma assessors were chosen to evaluate if an obvious aroma remained in the composition on the stainless-steel plate. The evaluation was performed once every 8 hours. When the composition did not release the aroma any more basically, the total aroma release time was taken down. The compositions from Embodiments 1 to 19 and Comparative Examples 1 to 4 were tested in sequence.

TABLE 2

Aroma scores and test results of total aroma release time

| Number of Embodiment/ Comparative Example | Aroma score | Total aroma release time/h |
| --- | --- | --- |
| Embodiment 1 | 88.1 | 360 |
| Embodiment 2 | 90.0 | 376 |
| Embodiment 3 | 89.2 | 368 |
| Embodiment 4 | 91.3 | 384 |
| Embodiment 5 | 92.3 | 392 |
| Embodiment 6 | 91.8 | 400 |
| Embodiment 7 | 91.0 | 408 |
| Embodiment 8 | 92.5 | 416 |
| Embodiment 9 | 92.9 | 424 |
| Embodiment 10 | 92.7 | 432 |
| Embodiment 11 | 92.4 | 400 |
| Embodiment 12 | 91.4 | 448 |
| Embodiment 13 | 94.3 | 432 |
| Embodiment 14 | 95.2 | 440 |
| Embodiment 15 | 95.4 | 352 |
| Embodiment 16 | 94.2 | 424 |
| Embodiment 17 | 95.1 | 432 |
| Embodiment 18 | 96.5 | 456 |
| Embodiment 19 | 95.8 | 464 |
| Comparative Example 1 | 28.5 | 0 |
| Comparative Example 2 | 67.8 | 72 |
| Comparative Example 3 | 78.5 | 248 |
| Comparative Example 4 | 82.6 | 304 |

In combination with Embodiments 1 to 3 and Comparative Examples 1 to 2 and with reference to Table 2, it can be seen that, in the case of Comparative Example 1 where the temperature-sensitive sustained-release essential oil microcapsule is not added, the aroma score is lower than 29, indicating an inharmonious aroma and an obvious smell of the resin; in the case of Comparative Example 2 where the vegetable essential oil is added directly based on Comparative Example 1, the aroma score increases to 67.8, indicating the presence of the aroma of the essential oil but higher aroma dissipation speed since the total aroma release time is only 72 h; and in the case of Embodiments 1 to 3 where the temperature-sensitive sustained-release essential oil microcapsule prepared from the vegetable essential oil and the capsule wall is added to the respective compositions, the aroma score is more than 88, indicating that the compositions from Embodiments 1 to 3 have the moderate and harmonious aroma unique to the essential oil. In general, after wearing the nail stickers, people use them for about half a month. Hence, it is necessary for the present application to control the total aroma release time to be longer than 15 days. If the total aroma release time is too long, more temperature-sensitive sustained-release essential oil microcapsules would be required, leading to increased cost of the nail stickers. If the total aroma release time is too short, the aroma would have been completely released before the nail stickers reach their service lives, and the covered smell of resin would be released again. For Embodiments 1 to 3 of the present application, the total aroma release time is more than 360 h at the constant temperature of 35° C., and Embodiment 2 has the highest aroma score and the longest total aroma release time.

In combination with Embodiment 2 and Comparative Examples 3 and 4 and with reference to Table 2, it can be seen that, in the case of Comparative Example 3 where the epoxy resin is substituted with the polyurethane resin, the aroma score and the total aroma release time decrease significantly, indicating that the raw material of the capsule wall has a great effect on the performance of the temperature-sensitive sustained-release essential oil microcapsule; and in the case of Comparative Example 4 where the addition amount of the N-isopropylacrylamide is reduced, the aroma score and the total aroma release time decrease significantly, indicating that the raw material of the capsule wall has a great effect on the performance of the temperature-sensitive sustained-release essential oil microcapsule.

In combination with Embodiments 2 and 4 to 7 and with reference to Table 2, it can be seen that, when the amount of the used raw materials of the capsule wall is 100 parts, the aroma score and the total aroma release time decrease in the case of Embodiment 2 where the amount of the used chamomile essential oil is less than 100 parts, and the aroma score and the total aroma release time are higher than those of Embodiment 2 but lower than those of Embodiments 4 to 6 in the case of Embodiment 7 where the amount of the used chamomile essential oil is more than 150 parts. This indicates that the raw-material weight ratio of the capsule core to the capsule wall is preferably (100-150):100, wherein both the aroma score and the total aroma release time of Embodiment 5 are the highest.

In combination with Embodiments 5 and 8 to 12 and with reference to Table 2, it can be seen that, in the case of Embodiment 11 where a small amount of white carbon black is added to the capsule core, the aroma score and the total aroma release time increase. This is possibly due the fact that, when the capsule wall is used alone to control the release of the essential oil, the release rate of the essential oil is fast, and the white carbon black can absorb a part of the essential oil to coordinate with the capsule wall to reduce the release rate of the essential oil and prolong the release time of the essential oil, thereby balancing the release rate and the release time of the essential oil. Meanwhile, the color of the composition is less affected by the white carbon black. In the case of Embodiment 12 where a large amount of white carbon black is added to the capsule core, the total aroma release time increases but the aroma score decreases. This is possibly due to the fact that more essential oil enters the micropores of the white carbon black, and the release rate of the essential oil become slower, leading to a light aroma. In the case of Embodiments 8 to 10 where the weight ratio of the white carbon black to the vegetable essential oil is controlled to be (12-24):120, both the aroma score and the total aroma release time are higher, wherein the aroma score and the total aroma release time of Embodiment 9 are both highest, indicating that the weight ratio of the white carbon black to the vegetable essential oil is preferably (12-24):120.

In combination with Embodiments 9 and 13 to 17 and with reference to Table 2, it can be seen that, in the case of Embodiments 13 to 15 where the homogenizing pressure is increased gradually, the aroma score and the total aroma release time of Embodiments 13 and 14 increase in sequence, but Embodiment 15 shows an increase in the aroma score but a significant decrease in the total aroma release time. This is possibly due to the fact that the excessively high homogenizing pressure leads to small particle size of essential oil molecules, resulting in high aroma release rate. In the case of Embodiment 16 where the homogenizing time is reduced while keeping the pressure at 600 bar, the aroma score and the total aroma release time slightly decrease, but with little effect. In the case of Embodiment 17 where the homogenizing time is reduced while keeping the pressure at 800 bar, the aroma score and the total aroma release time slightly decrease, but with little effect. Since both high homogenizing pressure and long homogenizing time would lead to increased product cost, the homogenizing time is preferably 2-5 min and the pressure is preferably 600 bar in the step of homogenizing.

Embodiment 23

Figure 1:
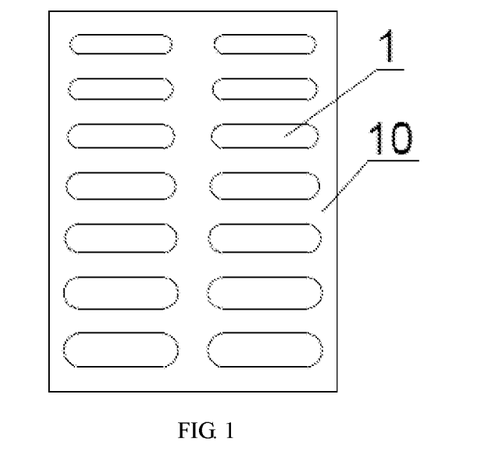
FIG. 1 is a schematic structural diagram of a nail sticker according to Embodiment 23 of the present application.
Figure 2:
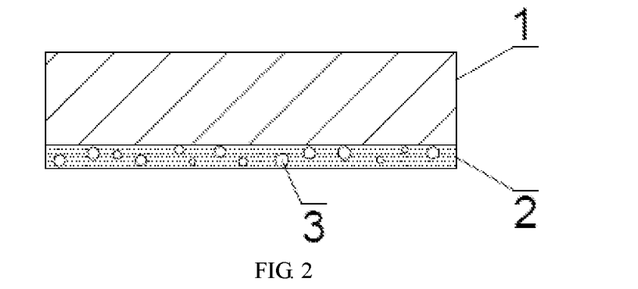
FIG. 2 is a sectional view of the nail sticker according to Embodiment 23 of the present application.
Figure 3:
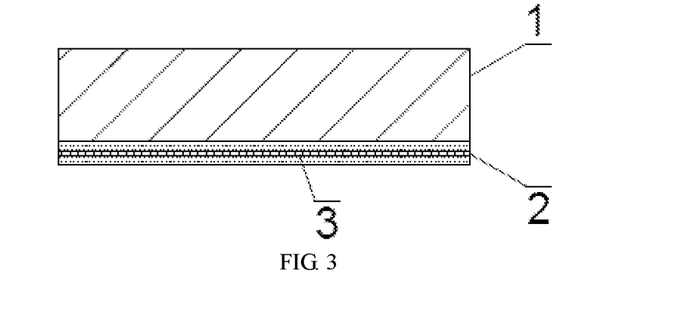
FIG. 3 is a sectional view of a nail sticker according to Embodiment 24 of the present application.

In this embodiment, a nail sticker is further provided. As shown in FIG. 1 and FIG. 2, the nail sticker includes a carrier 1 and an adhesive layer 2 disposed on a back surface of the carrier 1. The carrier 1 has one or more of a shape, a pattern and a color to make up the appearance of the nail sticker. Before use, the carrier 1 is stuck to a release film 10 via the adhesive layer 2. When in use, the carrier 1 is stuck to the surface of a human tissue via the adhesive layer 2; the carrier 1 is of a layer structure, and at least one layer of the carrier 1 has the composition for the nail sticker as defined in any one of foregoing Embodiments 1 to 22.

Compared with the prior art, at least one layer in the carrier 1 of the nail sticker in this embodiment contains the previously defined composition for the nail sticker; and the nail sticker may stick to a user's nail in a soft state before UV thermal curing, and perfectly fit the curved radian of the nail surface to reduce gaps and bubbles that were possibly generated on the nail surface, and to enhance the adhesion between the nail sticker and the nail. After the nail sticker is stuck to a nail and then subjected to UV thermal curing, the cured nail sticker is firmly stuck to the nail in a glossy and hard state.

In particular, the adhesive layer 2 herein has microporous particles 3 and is of a microporous structure. The micropores of at least part of the microporous particles 3 are connected to the microporous structure of the adhesive layer 2, and then connected to the external environment via the microporous structure of the adhesive layer 2.

It should be noted that the human tissue herein mainly refers to an epithelial tissue and a connective tissue, in particular skin, a finger nail, a toe nail or the like.

In addition, the adhesive layer 2 in this embodiment of the present application is of a microporous structure, via which the air between the surface of a human tissue and the outside can ventilate, thereby achieving good air permeability. During the process of UV thermal curing, the secretion of oil, lipids, sweat, exfoliated keratinocytes or the like from the surface of the human tissue is accelerated under the action of heat and the like, and these secreta may affect the adhesion between the adhesive layer 2 and the surface of the human tissue. The air-permeable adhesive layer 2 is helpful for the evaporation or volatilization of the secreta, and further provides channels for discharging the secreta, thereby keeping the surface of the human tissue clean and dry and enhancing the durability of the nail sticker.

After the nail sticker is stuck to the surface of the human tissue through UV thermal curing, due to the good air permeability of the adhesive layer 2, the exocrine substances on the surface of the human tissue can be evaporated or volatilized and then discharged through the microporous structure, to keep the surface of the human tissue and the surface of the adhesive layer 2 clean and dry and the adhesive layer 2 firmly stuck, such that the carrier can be persistently and effectively attached to the surface of the human body.

In addition, the microporous particles 3 enhance the microporous structure of the adhesive layer 2, providing more microporous gaps for the circulation of air and the evaporation or volatilization of secreta. Meanwhile, the microporous particles 3 also help to improve the absorptivity of the nail sticker for water, oil, sound, shock and the like.

In light of the use characteristics of the nail sticker, the thickness of the adhesive layer 2 is configured to be 10-100 μm, and the microporous structure of the adhesive layer 2 include pores of 10-200 nm. The micropore space in such a structure effectively provides channels for discharging evaporated or volatilized human secreta to the outside.

As shown in FIG. 2, the microporous particles 3 are uniformly dispersed in the adhesive layer 2 to ensure the uniformity of the overall structure of the adhesive layer 2, where the microporous structure is uniform in distribution and even in air permeability, such that excellent air permeability is achieved, which is helpful for the evaporation or volatilization of the secreta and the like.

The microporous particles 3 are one or more of activated carbon particles, silicon dioxide particles, coral sand particles or zeolite particles. As the microporous particles 3, these substances exhibit the porous characteristic to achieve the effects listed previously, and also to achieve the effects of absorbing dust, removing undesirable odor and the like, thereby keeping the surface of the human tissue dust-free and odorless. The adhesive layer 2 may persistently and effectively attach the carrier 1 to the surface of the human tissue.

In light of the use characteristics of the nail sticker and the structural characteristics of the adhesive layer 2, the particle size of the microporous particle 3 is configured to be 5-20 μm, with a pore space of 2-50 nm. With smaller microporous particles 3, the granular sensation created by the microporous particles 3 in the adhesive layer 2 can be reduced to keep a flat surface for the adhesive layer 2. The human secreta can be effectively absorbed via the pores of the microporous particles 3 and then discharged through evaporation or volatilization.

Embodiment 24

Embodiment 24 of the present application provides a nail sticker, which is designed and implemented based on the nail sticker in Embodiment 23 but has an actual process or structure similar to but somewhat different from those in Embodiment 23. The following focuses on the description of differences. Except for the detailed description of the differences, any other description is deemed as the same as those in Embodiment 23 and thus is not repeated.

Figure 4:
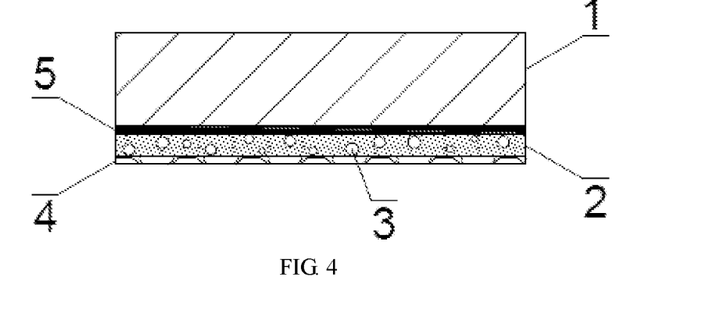
FIG. 4 is a sectional view of a nail sticker according to Embodiment 25 of the present application.

In Embodiment 24, as shown in FIG. 4, the microporous particles 3 form a layer located in the adhesive layer 2. In this way, the microporous particles 3 are dispersed as a layer in the adhesive layer 2 to ensure the uniformity of the overall structure of the adhesive layer 2, where the microporous structure is uniform in distribution and even in air permeability, such that excellent air permeability is achieved, which is helpful for the evaporation or volatilization of the secreta and the like.

The microporous particles 3 in this layer may be disposed at a top position, a bottom position of a middle position in the adhesive layer 2. In this embodiment, the microporous particles 3 are disposed at the middle position to simultaneously achieve the effect of strengthening the structure.

Embodiment 25

Embodiment 25 of the present application provides a nail sticker, which is designed and implemented based on the nail stickers in Embodiments 23 and 24 but has an actual process or structure similar to but somewhat different from those in Embodiments 23 and 24. The following focuses on the description of differences. Except for the detailed description of the differences, any other description is deemed as the same as those in Embodiments 23 and 24 and thus is not repeated.

In Embodiment 25, as shown in FIG. 4, an air-permeable substrate 4 is disposed on a surface of the adhesive layer 2 away from the carrier 1. After the adhesive layer 2 is applied to the air-permeable substrate 4, air directly passes through micropores in the material of the air-permeable substrate 4 per se and the air-permeable micropores formed in the adhesive layer 2 during application, and then reaches a back surface of the air-permeable substrate 4, thereby achieving the purpose of ventilation. In addition, the air-permeable substrate 4 may also improve the structural strength of the adhesive layer 2 and play a role of supporting the carrier 1.

Here, the air-permeable substrate 4 may be a woven fabric, a non-woven fabric, a knitted fabric and paper, and may also be a porous film or an air-permeable film.

Furthermore, an insulating layer 5 is disposed between the carrier 1 and the adhesive layer 2. The insulating layer 5 is disposed to achieve a supporting effect for bearing the carrier 1 and improving the connection force between the carrier 1 and the adhesive layer 2. Meanwhile, the insulating layer 5 endows more possibilities to the carrier 1. With the blockage of the insulating layer 5, in the case of designing a layer structure, shape, pattern or the like for the carrier 1, there is no need to worry about the infiltration of the material or color to the surface of the human tissue via the air-permeable adhesive layer 2. The insulating layer 5 is helpful for fixing the shape, pattern and color in the carrier 1 to keep the stability of the shape, pattern and color.

The insulating layer 5 may be a Pe layer, a PU layer, a plastic sheet, a plastic film, plastic paper or the like.

Embodiment 26

Embodiment 26 of the present application provides a nail sticker, which is designed and implemented based on the nail stickers in Embodiments 23 to 25 but has an actual process or structure similar to but somewhat different from those in Embodiments 23 to 25. The following focuses on the description of differences. Except for the detailed description of the differences, any other description is deemed as the same as those in Embodiments 23 to 25 and thus is not repeated.

In Embodiment 26, a multi-layer structure of the carrier 1 includes the insulating layer 5, the pattern layer, the color layer, the hot stamping layer, the coating layer, the gloss oil layer, the decoration layer and the topmost varnish layer, as described previously.

The pattern layer, the color layer, the hot stamping layer, the coating layer, the gloss oil layer, and the decoration layer in the carrier 1 may be one or more and may be stacked in any combination. At least one of the insulating layer 5, the pattern layer, the color layer, the hot stamping layer, the coating layer, the gloss oil layer, and the decoration layer is made of the composition for the nail sticker as mentioned in any one of Embodiments 1 to 22, or is prepared by mixing the composition for the nail sticker and a resin or other additives.

A side of the carrier 1 away from the adhesive layer 2 may be further provided with a release protective film 6 for insulating the unused carrier 1 from external water vapor, light and heat, thereby slowing down the ageing of the carrier 1 and the adhesive layer 2.

A side of the adhesive layer 2 away from the carrier 1 may be further provided with a release film 7 for insulating the unused adhesive layer 2 from external water vapor, light and heat, thereby keeping the stickiness of the adhesive layer 2.

Figure 5:
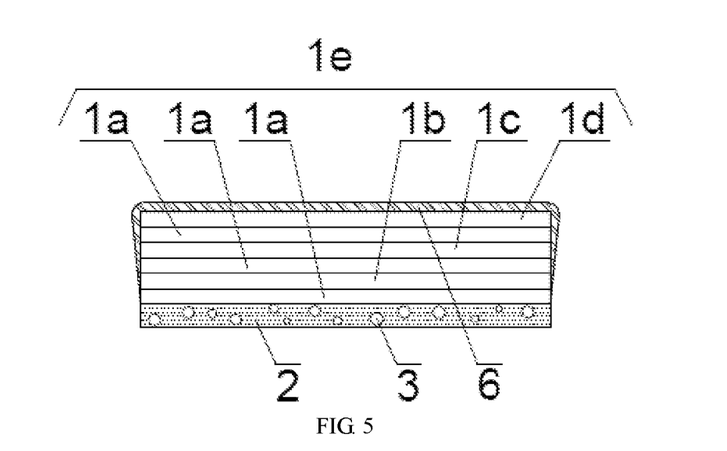
FIG. 5 is a sectional view I of a nail sticker according to Embodiment 26 of the present application.
Figure 6:
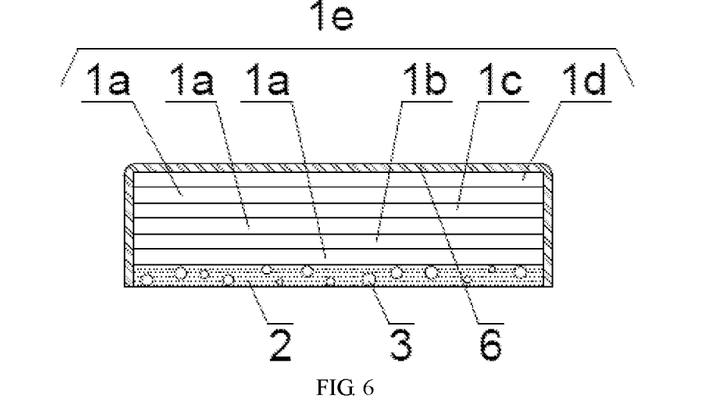
FIG. 6 is a sectional view II of the nail sticker according to Embodiment 26 of the present application.

In Embodiment 26, the carrier may be as shown in FIG. 5, where a gloss oil layer 1a, a color layer 1b, a gloss oil layer 1a, a hot stamping layer 1c, a gloss oil layer 1a, a decoration layer 1d and a topmost varnish layer 1e are stacked from the adhesive layer 2 in sequence, and the varnish layer 1e is wrapped around the periphery of the carrier 1. Without doubt, in other embodiments, the varnish layer 1e may also be wrapped around the peripheries of the carrier 1 and the adhesive layer 2 as shown in FIG. 6. The carrier 1 may achieve a corresponding function under the action of respective layers, and may also contain the above-mentioned composition for the nail sticker to fit the curved surface of a nail and to be cured and firmly fixed on the user's nail in a gloss and hard state, thereby keeping the attractive appearance of the nail sticker and prolonging the service life of the nail sticker.

In addition to the above-mentioned composition for the nail sticker that is possibly added to the gloss oil layer 1a, the color layer 1b, the hot stamping layer 1c, the decoration layer 1d and the varnish layer 1e, the reset of the components are those commonly used in the fields of nail polishes, nail stickers and fake nails.

The gloss oil layer 1a is a kind of clear lacquer for enhancing the interlayer connection to ensure that the carrier 1 is not delaminated on the whole before and after the UV thermal curing.

The color layer 1b may be a resin with a pigment added thereto, or may be formed from a colored sheet.

The hot stamping layer 1c is formed through bronzing, silver bronzing and laser with various colors, which can protect the hot stamping layer 1c and improve a flickering effect.

The decoration layer 1d may be formed with one or more of sequins, glittering diamonds, glittering powder, magnetic powder or the like.

The varnish layer 1e is a kind of clear lacquer, and is disposed on the periphery of the carrier 1 to provide brightness and scratch resistance to the cured nail sticker and protect other layer structures in the carrier 1.

These specific embodiments are merely for the purpose of explaining the present application, and are not intended to limit the present application. After reading the present specification, those skilled in the art can make modifications to the embodiments as needed without creative contributions. These modifications shall be protected by the patent law as long as then fall within the scope of the claims of the present application.

What is claimed is:

1. A composition for a nail sticker, wherein raw materials of the composition comprise a sizing material; and
   the sizing material is made of the following raw materials in parts by weight:
   45-85 parts of a UV thermosetting resin,
   2-9 parts of a photoinitiator,
   1.5-2 parts of a curing agent,
   0.1-1 part of a thermal promoter, and
   0.1-1 part of a leveling agent,
   wherein the UV thermosetting resin is made of the following raw materials in parts by weight:
   10-15 parts of 2-hydroxyethyl methacrylate,
   15-35 parts of an epoxy resin, 8-12 parts of isocyanate,
10-15 parts of a polyester polyol,
0.05-0.3 parts of a polymerization inhibitor,
0.5-1 part of a silane coupling agent, and
10-20 parts of an acrylate monomer.

2. The composition for the nail sticker according to claim 1, wherein the UV thermosetting resin is prepared by the following method: (1) mixing the 2-hydroxyethyl methacrylate, the epoxy resin, the isocyanate, the polymerization inhibitor and the silane coupling agent, uniformly stirring a resulting mixture for reacting for 2-4 hours under a condition of 30-50° C., and heating a resultant to 75-85° C. for reacting for 1-2 hours to obtain a substance A; and (2) mixing the substance A with the polyester polyol, heating a resulting mixture to 60-65° C. for reacting for 1-1.5 hours, then adding the acrylate monomer, and heating a resultant to 70-80° C. for reacting for 1-2 hours to obtain the UV thermosetting resin.

3. A composition for a nail sticker, wherein raw materials of the composition comprise a sizing material; and
the sizing material is made of the following raw materials in parts by weight:
45-85 parts of a UV thermosetting resin,
2-9 parts of a photoinitiator,
1.5-2 parts of a curing agent,
0.1-1 part of a thermal promoter, and
0.1-1 part of a leveling agent,
wherein the raw materials of the composition further comprise a temperature-sensitive sustained-release essential oil microcapsule, and a weight ratio of the sizing material to the temperature-sensitive sustained-release essential oil microcapsule ranges from 100:1 to 100:5; and the temperature-sensitive sustained-release essential oil microcapsule comprises a capsule core and a capsule wall wrapping the capsule core, the capsule core comprises vegetable essential oil, and the capsule wall is made of the following raw materials in parts by weight:
40-60 parts of N-isopropylacrylamide,
10-20 parts of epoxy resin,
0.001-0.002 parts of potassium persulfate,
2-4 parts of lauryl sodium sulfate, and
polyurethane resin, wherein a total of the N-isopropylacrylamide, the epoxy resin, the potassium persulfate, the lauryl sodium sulfate, and the polyurethane resin is 100 parts by weight.

4. The composition for the nail sticker according to claim 3, wherein the temperature-sensitive sustained-release essential oil microcapsule is prepared by the following method: uniformly mixing the vegetable essential oil and an amount of ethanol, and homogenizing a resulting mixture to obtain a capsule core solution; mixing the N-isopropylacrylamide, the epoxy resin, the potassium persulfate, the lauryl sodium sulfate, and the polyurethane resin, and uniformly stirring a resulting mixture to obtain a capsule wall prepolymer; and adding the capsule core solution to the capsule wall prepolymer, and performing uniform stirring, suction filtration and drying the resultant to obtain the temperature-sensitive sustained-release essential oil microcapsule.

5. A method for preparing the composition for the nail sticker according to claim 1, comprising the following steps:
uniformly mixing the UV thermosetting resin, the photoinitiator, the curing agent, the thermal promoter and the leveling agent to obtain the composition for the nail sticker.

6. A nail sticker, comprising a carrier and an adhesive layer on a surface of the carrier, wherein the carrier is a multi-layer, wherein at least one layer of the carrier has the composition for the nail sticker according to claim 1.

7. The nail sticker according to claim 6, wherein the adhesive layer has microporous particles and is of a microporous structure, and the microporous particles are connected to an external environment via the microporous structure of the adhesive layer.

8. The nail sticker according to claim 7, wherein an insulating layer is disposed between the carrier and the adhesive layer.

9. The nail sticker according to claim 7, wherein the microporous particles are one or more of activated carbon particles, silicon dioxide particles, coral sand particles or zeolite particles.

10. The nail sticker according to claim 7, wherein the microporous particles are uniformly dispersed in the adhesive layer; or
the microporous particles form a layer located in the adhesive layer.

11. The nail sticker according to claim 7, wherein a surface of the adhesive layer away from the carrier is provided with an air-permeable substrate.

12. The nail sticker according to claim 7, wherein the carrier comprises one or more of a pattern layer, a color layer, a hot stamping layer, a coating layer, a gloss oil layer and a decoration layer, and a topmost layer of the carrier is further provided with a varnish layer.

* * * * *